United States Patent
Iyer et al.

(10) Patent No.: US 11,354,161 B2
(45) Date of Patent: Jun. 7, 2022

(54) CONTROLLING MEMORY UTILIZATION BY A TOPIC IN A PUBLISH-SUBSCRIBE ENVIRONMENT

(71) Applicant: Bank of America Corporation, Charlotte, NC (US)

(72) Inventors: Venkatraman Nagarajan Iyer, Mumbai (IN); Gaurav Harish Srivastava, Mumbai (IN)

(73) Assignee: Bank of America Corporation, Charlotte, NC (US)

( * ) Notice: Subject to any disclaimer, the term of this patent is extended or adjusted under 35 U.S.C. 154(b) by 103 days.

(21) Appl. No.: 16/989,177

(22) Filed: Aug. 10, 2020

(65) Prior Publication Data

US 2022/0043682 A1 Feb. 10, 2022

(51) Int. Cl.
G06F 15/16 (2006.01)
G06F 9/54 (2006.01)
H04L 29/06 (2006.01)
G06F 9/50 (2006.01)
H04L 12/18 (2006.01)
G06F 11/30 (2006.01)

(52) U.S. Cl.
CPC ............ *G06F 9/5016* (2013.01); *G06F 9/546* (2013.01); *G06F 11/3051* (2013.01); *H04L 12/1859* (2013.01); *G06F 2201/81* (2013.01)

(58) Field of Classification Search
CPC .... G06F 9/5016; G06F 9/546; G06F 11/3051; G06F 2201/81; H04L 12/1858
USPC .......................................................... 709/213
See application file for complete search history.

(56) References Cited

U.S. PATENT DOCUMENTS

| 5,754,782 A | 5/1998 | Masada |
| 6,529,902 B1 | 3/2003 | Kanevsky et al. |
| 7,437,417 B2 | 10/2008 | Reynolds et al. |
| 7,680,900 B2 | 3/2010 | Duigenan et al. |
| 7,720,914 B2 | 5/2010 | Goodman et al. |

(Continued)

FOREIGN PATENT DOCUMENTS

| WO | 2012156851 A1 | 11/2012 |
| WO | 2012027853 A1 | 3/2015 |

OTHER PUBLICATIONS

Iyer, V. N. et al., "Restoring Messages to a Memory Utilized by a Topic in a Publish-Subscribe Environment," U.S. Appl. No. 16/989,355, filed Aug. 10, 2020, 46 pages.

*Primary Examiner* — Hamza N Algibhah

(57) ABSTRACT

An apparatus is provided to manage memory utilization by a topic in a publish-subscribe environment, wherein the topic is a logical container for the messages. The apparatus includes a primary memory device configured to store messages published to a topic, and a secondary storage device. A processor operationally coupled to the primary and secondary memory devices is configured to monitor utilization of a portion of the primary memory device assigned to the topic. In response to detecting that the utilization of the portion of the primary memory device has equaled or exceeded a threshold for memory utilization, the processor performs at least one of throttling the rate of publishing to the topic and transferring a portion of the messages from the topic to the secondary memory device. Each of the throttling and the transferring keeps the portion of the primary memory device assigned to the topic from overloading.

18 Claims, 4 Drawing Sheets

(56) References Cited

U.S. PATENT DOCUMENTS

| | | |
|---|---|---|
| 7,882,253 B2 | 2/2011 | Pardo-Castellote et al. |
| 7,890,489 B2 | 2/2011 | Stewart et al. |
| 7,890,572 B2 | 2/2011 | Goodman et al. |
| 7,996,668 B2 | 8/2011 | Diep et al. |
| 8,082,554 B2 | 12/2011 | Craggs et al. |
| 8,140,630 B2 | 3/2012 | Jones et al. |
| 8,364,640 B1 | 1/2013 | Beatty et al. |
| 8,386,438 B2 | 2/2013 | Beatty et al. |
| 8,386,577 B2 | 2/2013 | Hickson et al. |
| 8,458,115 B2 | 6/2013 | Cai et al. |
| 8,489,694 B2 | 7/2013 | Bhogal et al. |
| 8,516,052 B2 | 8/2013 | Fu et al. |
| 8,566,402 B2 | 10/2013 | Cullen |
| 8,615,580 B2 | 12/2013 | Beardsmore et al. |
| 8,732,228 B2 | 5/2014 | Edwards et al. |
| 8,738,704 B2 | 5/2014 | Stark et al. |
| 8,756,288 B2 | 6/2014 | Bedi et al. |
| 8,843,580 B2 | 9/2014 | Beardsmore et al. |
| 8,849,754 B2 | 9/2014 | Craggs |
| 8,886,609 B2 | 11/2014 | Buragohain et al. |
| 8,935,330 B2 | 1/2015 | Jellard |
| 8,938,502 B2 | 1/2015 | Kahan et al. |
| 8,954,504 B2 | 2/2015 | Banks et al. |
| 8,959,162 B2 | 2/2015 | Bhogal et al. |
| 8,972,451 B2 | 3/2015 | Eslambolchi et al. |
| 9,372,739 B2 | 6/2016 | Beardsmore et al. |
| 9,479,387 B2 * | 10/2016 | Arabo ............... H04L 29/08693 |
| 9,501,404 B2 | 11/2016 | Palmer et al. |
| 9,537,747 B2 | 1/2017 | Karenos et al. |
| 9,635,083 B2 | 4/2017 | Meijer |
| 9,894,080 B1 * | 2/2018 | Youssef ................ H04L 63/18 |
| 10,268,414 B2 * | 4/2019 | Parra .................... H04L 47/38 |
| 10,496,652 B1 * | 12/2019 | Bharat ............... G06F 16/9535 |
| 10,776,355 B1 * | 9/2020 | Batsakis ............. G06F 16/901 |
| 11,122,000 B1 * | 9/2021 | Saalfeld .............. H04L 67/42 |
| 2002/0049739 A1 * | 4/2002 | Hong .................. G06F 16/954 |
| 2004/0254993 A1 | 12/2004 | Mamas |
| 2005/0021843 A1 | 1/2005 | Duigenan et al. |
| 2005/0096928 A1 | 5/2005 | Ruggaber et al. |
| 2005/0114562 A1 * | 5/2005 | Barnes ................ G06F 11/349 |
| | | 710/29 |
| 2005/0268146 A1 | 12/2005 | Jin et al. |
| 2007/0106974 A1 | 5/2007 | Chafe et al. |
| 2007/0245018 A1 | 10/2007 | Bhola et al. |
| 2008/0244696 A1 | 10/2008 | Bhola et al. |
| 2009/0271483 A1 | 10/2009 | Whitehead et al. |
| 2010/0191742 A1 | 7/2010 | Stefik et al. |
| 2011/0258268 A1 | 10/2011 | Banks et al. |
| 2012/0215873 A1 | 8/2012 | Beardsmore et al. |
| 2013/0185106 A1 | 7/2013 | Donatone et al. |
| 2013/0346521 A1 * | 12/2013 | Arabo ............... H04L 29/08693 |
| | | 709/206 |
| 2014/0195622 A1 | 7/2014 | Cullen |
| 2014/0286354 A1 | 9/2014 | Van De Poel et al. |
| 2014/0324959 A1 * | 10/2014 | Hudson ................ H04L 67/322 |
| | | 709/203 |
| 2016/0014038 A1 * | 1/2016 | Thyagarajan ......... G06F 9/5077 |
| | | 709/226 |
| 2017/0104836 A1 * | 4/2017 | Gray-Donald .......... H04L 51/14 |
| 2018/0167476 A1 * | 6/2018 | Hoffner .................. H04L 67/26 |
| 2019/0324649 A1 * | 10/2019 | Rodgers ............. G06F 11/3072 |
| 2021/0133008 A1 * | 5/2021 | Rodean ................. H04L 67/26 |

* cited by examiner

CONTROLLING MEMORY UTILIZATION BY A TOPIC IN A PUBLISH-SUBSCRIBE ENVIRONMENT

TECHNICAL FIELD

The present disclosure relates generally to managing memory utilization, and more specifically to controlling memory utilization by a topic in a publish-subscribe environment.

BACKGROUND

Publish-subscription (pub-sub) messaging patterns are communication models used in many different industries today. For example, pub-sub is used in banking systems, weather systems, and other systems that require techniques to notify multiple entities of common information. In general, pub-sub is a messaging paradigm where senders (publishers) of messages typically are not programmed to send their messages to specific receivers (subscribers). Rather, published messages can be characterized into classes, without knowledge of what (if any) subscribers there may be. Subscribers express interest in one or more classes and can receive messages that are of interest, without knowledge of what publishers there are.

In a publish-subscribe model, subscribers typically receive only a subset of the total messages published. The process of selecting messages for reception and processing is called filtering. One common form of filtering is topic-based filtering. In a topic-based system, messages are published to "topics" or named logical channels. Subscribers in a topic-based system receive all messages published to the topics to which they subscribe. The publisher is responsible for defining the topics to which subscribers can subscribe.

The performance of a topic is generally limited by resources available at a device (e.g., a publish-subscribe server) hosting the topic. For example, an amount of information that may be contained in a topic is limited by an amount of memory space available at the device to store the information contained in the topic. As the amount of information contained in the topic reaches a certain level of memory occupancy, the topic and one or more applications using the topic start misbehaving or stop responding altogether. This situation is often referred to as a topic overload or memory overload of the memory storing the topic. In current systems, the only way to recover from a topic overload situation is to clear the topic of all information and restart the topic. However, this method is not ideal as restarting the topic involves loss of useful data previously stored in the topic and certain topic downtime.

SUMMARY

The system and methods implemented by the system as disclosed in the present application provide technical solutions to the technical problems discussed above by monitoring utilization of memory assigned for storing information contained in a topic and by dynamically adjusting the utilization of the memory by the topic so as to not exceed a certain threshold memory utilization. The disclosed system and methods provide several practical applications and technical advantages. For example, in one embodiment disclosed in the following description, the system monitors a rate at which information is being published to the topic and dynamically adjusts the rate to keep the memory from being occupied beyond a selected threshold memory occupancy. In another embodiment, the system monitors an amount of memory occupied by the information contained in the topic and transfers at least a portion of the information to a secondary storage device to bring the memory occupancy below a selected threshold memory occupancy. By keeping the amount of memory occupied by the topic below a certain threshold memory occupancy, the system keeps a topic from overloading and thus keeps the topic and one or more applications using the topic from becoming unresponsive as a result of a topic overload. Further, the system performs adjustments of the topic publishing rate and transfers information to the secondary memory device in real-time, thus avoiding the need to clear the topic of all information and restart the topic in order to recover from a topic overload. As a result, any topic downtime and resulting interruption of the publish-subscribe service is avoided.

In additional embodiments, when the memory occupancy falls below a threshold memory occupancy, the system restores to the topic information that was previously stored to the secondary storage device in order to keep the topic from overloading. This avoids loss of useful information from the topic.

Thus, the systems and methods disclosed herein may improve the efficiency of a computing system by managing memory resources of the computing system to keep one or more applications using a topic-based publish-subscribe pattern from becoming unresponsive as a result of a topic overload.

In one or more aspects, an apparatus includes a primary memory device and a secondary memory device. The primary memory device is configured to store messages published to a topic. The topic is a logical container for the messages and one or more of the messages can be published to the topic by a publishing entity for delivery of the one or more messages to one or more subscribers of the topic. The apparatus further includes a processor operationally coupled to the primary memory device and the secondary memory device. The processor is configured to monitor utilization of a portion of the primary memory device assigned to the topic and detect that the utilization of the portion of the primary memory device has equaled or exceeded a threshold for the utilization of the portion of the primary memory device. In response to the detecting, the processor is configured to perform at least one of throttling the rate of publishing of subsequent messages to the topic and transferring a portion of the messages from the topic to the secondary memory device, wherein each of the throttling and the transferring keeps the portion of the primary memory device assigned to the topic from overloading or causes recovery from the overloading. The monitoring the utilization comprises at least one of monitoring a rate of publishing of the messages to the topic and monitoring an occupancy level of the portion of the primary memory device assigned to the topic.

In one or more aspects, a method for managing resources utilized by a topic includes monitoring utilization of the resources by the topic, wherein the topic is a logical container for messages and utilizes a primary memory device to store the messages published to the topic. One or more of the messages can be published to the topic by a publishing entity for delivery of the one or more messages to one or more subscribers of the topic. In response to the detecting that the utilization of the resources has equaled or exceeded a threshold for the utilization of the resources, the method performs at least one of throttling the rate of publishing of subsequent messages to the topic and transferring a portion of the messages from the topic to a secondary memory device. Each of the throttling and the transferring keeps the portion of the primary memory device assigned to the topic from overloading or causes recovery from the overloading. The monitoring the utilization of the resources by the topic includes monitoring a rate of publishing of the messages to the topic, monitoring an occupancy level of a portion of the primary memory device assigned to the topic or a combination thereof.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
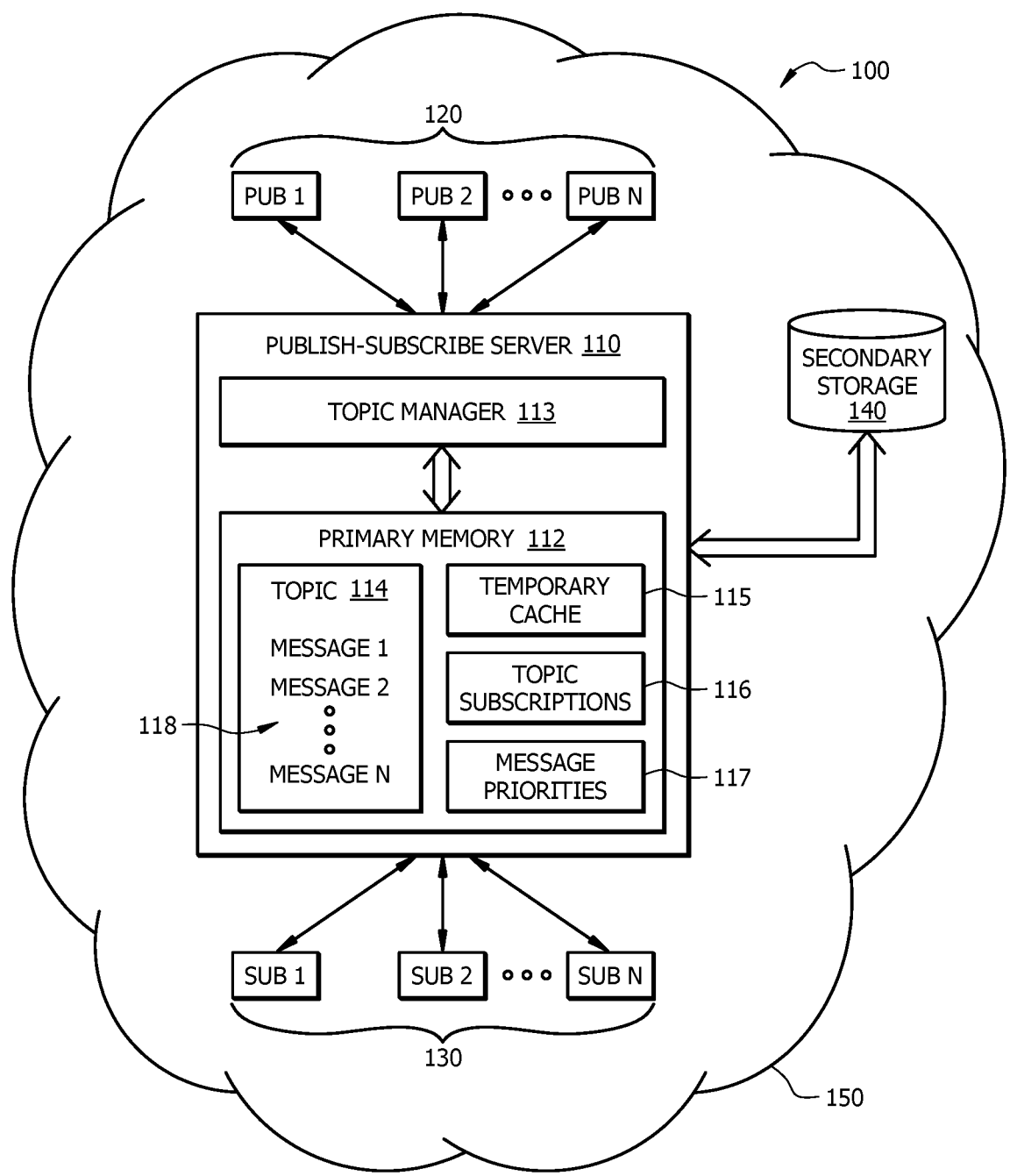
FIG. 1 illustrates an example topic-based publish-subscribe system, in accordance with certain aspects of the present disclosure.

Publish-subscribe systems provide a way of distributing data messages from publishing entities to subscribing entities. Such systems are especially useful where data supplied by a publisher is changing and a large number of subscribers need to be quickly updated with the latest data.

In such systems, publisher applications of data messages do not need to know the identity or location of the subscriber applications which will receive the messages. Similarly, the subscribing applications do not need to know the identity or location of the publishing application providing their information. In this sense, the providers and consumers are said to be loosely-coupled.

One example use case of a publish-subscribe system is one which provides stock-market information. Here a "feed" provides (publishes) a continuous flow of information containing the latest stock prices. The latest stock prices are required by traders who need this information in order to conduct trades. Traders register their interest in (subscribe to) particular stock prices and receive updates as prices change. Traders can be added or removed without disruption to the providers of the information who have no knowledge of who is receiving their information.

A publish-subscribe system may include a topic-based system in which messages are published to "topics" or named logical channels. A topic generally defines a type of information contained in the topic. The publisher is responsible for defining the topics to which subscribers can subscribe. Subscribers in a topic-based publish-subscribe system subscribe to one or more topics defined by the publisher and receive all messages published to the topics to which they subscribe. Thus, in a publish-subscribe system one thing which connects publishing and subscribing entities is the topic which the publisher associates with information published to the topic. Each different piece of information has its own topic associated with it. Subscribers nominate which types of information they want to receive by subscribing to specific topics. With respect to a given topic, all possible combinations of publishers and subscribers can be possible. For example, information can be published to a topic by a single or multiple publishing entities. Similarly, information published to a topic may be received and processed by one or more subscribing entities.

As described above, an amount of information that may be contained in a topic is limited by an amount of memory space available to store the information contained in the topic. A topic overload occurs when the amount of information contained in the topic reaches a certain level of memory occupancy, wherein the topic overload includes the topic and one or more applications using the topic misbehaving or becoming unresponsive. The topic overload may also be referred to as a memory overload of the memory or a portion of the memory storing information published to the topic. The terms topic overload and memory overload are used interchangeably in this disclosure. In current systems, the only way to recover from a topic overload or memory overload is to clear the topic of all information and restart the topic. However, this method is not ideal as restarting the topic involves loss of useful data previously stored in the topic and certain topic downtime.

Certain aspects of the present disclosure describe systems and techniques for keeping a topic from overloading or recovering from a topic overload in real-time without loss of data or topic downtime. For example, the disclosed aspects describe keeping a topic from overloading by not allowing the information contained in the topic to equal or exceed a threshold memory occupancy that may result in the topic overload. Additionally or alternatively, if a topic overload does occur as a result of the information contained in the topic equaling or exceeding the threshold memory occupancy, the disclosed aspects describe recovering from the topic overload by bringing the memory occupancy below the threshold. In order to accomplish these goals, aspects of the present disclosure describe monitoring resource utilization by the topic in order to detect a topic overload or a topic near overload situation.

Utilization of resource by the topic may include utilization of memory by the topic including how fast the memory is being occupied by information being published to the topic and how much of the memory is occupied by the information contained in the topic. Monitoring the resource utilization of the topic may include monitoring a rate of publishing information to the topic, monitoring an occupancy level of a memory utilized by the topic or a combination thereof. The rate of publishing information to the topic may be indicative of how fast the memory is being occupied by information being published to the memory storing the topic. The occupancy level of the memory utilized by the topic may be representative of an amount of the memory utilized for storing information contained in the topic. In response to detecting the topic overload or the topic near overload situation, at least one or more remedial actions may be taken in real-time in order to recover from a topic overload or keep a topic from overloading respectively, the one or more actions including at least one of throttling the rate of publishing information to the topic or transferring a portion of information from the topic to a secondary memory device. Throttling the rate of publishing includes reducing the rate at which information is published to the topic. By monitoring the resource utilization by the topic and implementing remedial measures in real-time in response to detecting the topic overload or the topic near overload situation, any topic downtime as a result of topic overload may be avoided. Further, one or more aspects describe restoring back to the topic information that was previously transferred out of the topic, when the resource utilization of the topic has dropped below a certain threshold. By restoring to the topic information previously transferred out of the topic to recover from a topic overload or near topic overload, any data loss is avoided.

In an aspect, the threshold utilization of resources may be set lower than a resource utilization that may cause topic/memory overload, in order to detect a near topic/memory overload. Alternatively, the threshold utilization of resources may be set equal to the resource utilization that may cause topic/memory overload in order to detect when a topic/memory overload occurs.

System Overview

FIG. 1 illustrates an example topic-based publish-subscribe system 100, in accordance with certain aspects of the present disclosure. As shown in FIG. 1, the publish-subscribe system 100 includes a publish-subscribe server 110, one or more publishing entities 120 shown as including pub 1, pub 2 . . . pub N and a one or more subscribing entities 130 shown as including sub 1, sub 2 . . . sub N.

The publish-subscribe server 110 includes a primary memory 112 and a topic manager 113. The primary memory 112 is configured to store pieces of information referred to as messages published to and contained in one or more topics maintained by the publish-subscribe server 110. As shown in FIG. 1, the primary memory 112 stores one or more messages 118 (shown as msg 1 to msg n) contained in a topic 114. The topic manager 113 may be implemented by at least one processor and may be configured to manage the topic 114 in real-time to keep the topic 114 from overloading or recover from an overload of the topic 114. As shown in FIG. 1, the primary memory 112 may further store a temporary cache 115 configured to temporarily store messages 118 received by the publish-subscribe server 110 while the received messages 118 are being processed by the topic manager 113. In addition, the primary memory 112 may store information relating to subscriptions 116 to the topic 114. In one or more aspects, the subscriptions 116 includes information relating to one or more subscribing entities 130 that have subscribed to receive information from the topic 114. The primary memory 112 may further store message priorities 117 associated with messages 118 contained in the topic 114 or in the temporary cache 115.

As shown in FIG. 1, the publish-subscribe server 110 may be communicatively coupled to a secondary storage device 140 configured to store messages forwarded to the secondary storage device 140 during throttling of a publishing rate of the messages 118 or during a clean-up of the topic 114 in order to keep the topic 114 from overloading or recover from an overload of the topic 114. As noted above, throttling of a publishing rate of the messages to the topic includes reducing the rate at which messages are published to the topic. Topic clean-up includes transferring a portion of the messages 118 from the primary memory 112 to the secondary storage device 140.

In one or more aspects, one or more of the publishing entities 120 and the subscribing entities 130 may include a computing device running one or more software applications. For example, each of one or more of the publishing entities 120 may be representative of a general-purpose computing system hosting software applications that may be installed and run locally on the computing system. Similarly, each of one or more of the subscribing entities 130 may be representative of a general-purpose computing system hosting software applications that may be installed and run locally on the computing system. The general-purpose computing system may include mobile computing systems including smart phones, tablet computers, laptop computers, or any other mobile computing devices or systems capable of running software applications and communicating with other devices. The general-purpose computing system may also include non-mobile computing devices such as desktop computers or other non-mobile computing devices capable of running software applications and communicating with other devices.

One or more of the servers 110, the publishing entities 120 and the subscribing entities 130 may be connected to a network 150. The network 150, in general, may be a wide area network (WAN), personal area network (PAN), a cellular network, or any other technology that allows devices to communicate electronically with other devices. In one or more aspects, the network 150 may be the internet.

One or more of the publishing entities 120 may publish messages 118 to the topic 114. One or more of the subscribing entities 130 may subscribe to the topic 114 and receive messages 118 published to the topic 114. As noted above, the publishing entities 120 and the subscribing entities 130 may be implemented in any one of multiple configurations. For example, messages 118 may be published to the topic 114 by a single or multiple publishing entities 120. Similarly, messages 118 published to the topic 114 may be received and processed by one or more of the subscribing entities 130.

As a representative example, in the context of a medical application, the publish-subscribe server 110 may belong to a centralized medical records keeper that facilitates collection and distribution of medical records. The medical records may include medical records of patients diagnosed with certain medical conditions designated as reportable medical conditions by public health organizations. In this context, publishing entities 120 may include hospitals, medical clinics, emergency rooms, urgent care centers, laboratory service centers and any other medical facility that provides medical care or related services to patients. The subscribing entities 130 may include public health agencies, clinicians, patients and governmental and private agencies charged with collection and analysis of such medical data. In accordance with this example implementation, each message published to the topic 114 may be a medical record of a patient. The publish-subscribe server 110 may be configured to receive medical records from the publishing entities 120 and publish the received medical records to the topic 114. The medical records may be forwarded to one or more subscribing entities 130 that subscribe to the topic 114.

It may be appreciated that while the publish-subscribe system 100 illustrates only one topic 114 stored in the primary memory 112 for ease of illustration, the publish-subscribe server 110 may maintain multiple topics and the primary memory 112 may store information contained in the multiple topics. Further, each of the publishing entities 120 may publish messages 118 to one or more of the multiple topics and each of the subscribing entities 130 may subscribe to one or more of the multiple topics.

Topic Manager

The topic manager 113 is configured to manage resource utilization by the topic 114 so that a topic is kept from overloading or a recovery from a topic overload situation is effected in real-time without loss of topic data or topic downtime. In one or more aspects, in order to accomplish these goals, the topic manager 113 monitors the utilization of resources by the topic 114 in real-time. In one or more aspects, utilization of resources by the topic 114 may include utilization of memory resources by the topic. As noted above, utilization of memory resources by the topic includes at least one of how fast the memory is being occupied by information being published to the topic and how much of the memory is being occupied by the information contained in the topic. For example, at least a portion of the primary memory 112 may be assigned for storing messages published to and contained in the topic 114. The topic manager 113 may be configured to monitor the utilization of the portion of the primary memory 112 by the topic 114. In one or more aspects, the topic manager 113 may be configured to monitor the utilization of the primary memory 112 by the topic 114 in real-time, for example, continuously, periodically or at selected time intervals.

In one or more aspects, monitoring the utilization of the primary memory 112 by the topic 114 may include at least one of monitoring a rate of publishing messages to the topic 114 or monitoring an occupancy level of the portion of the primary memory 112 assigned for storing messages related to the topic 114. The rate of publishing information to the topic 114 may be indicative of how fast the primary memory 112 is being occupied by messages 118 being published to the primary memory 112. The occupancy level of the primary memory 112 utilized by the topic may be representative of an amount of the primary memory 112 utilized for storing information contained in the topic. In one or more aspects, when the topic manager 113 detects that the utilization of the primary memory 112 has equaled or exceeded a pre-selected threshold for the utilization of the primary memory 112, the topic manager 113 is configured to perform one or more operations in order to bring back the utilization of the primary memory 112 below the pre-selected threshold. For example, in response to detecting that the utilization of the primary memory 112 has equaled or exceeded the pre-selected threshold, the topic manager 113 may throttle the rate of publishing subsequent messages 118 to the topic 114, transfer a portion of the messages 118 related to the topic 114 already stored in the primary memory 112 to the secondary storage device 140, or a combination thereof. By performing either one of the two or both of throttling the rate of publishing of messages 118 and transferring a portion of the messages 118 from the primary memory 112 to the secondary storage device 140, the topic manager 113 may avoid a potential overload of the topic 114 or recover from an overload of the topic 114.

In one or more aspects, the topic manager 113 may be configured to restore messages 118 from the secondary storage device 140 back to the topic 114 in the primary memory 112, when the utilization of resources by the topic 114 falls below a pre-selected threshold.

Throttling Publishing Rate of Messages

In one or more aspects, the topic manager 113 is configured to monitor the publishing rate of the messages to the topic 114 and dynamically adjust the rate of publishing based on a current publishing rate of the messages. The primary memory 112 generally supports up to a maximum publishing rate (e.g., 100,000 messages a second) and may overload if the message 118s are published faster than the maximum supported publishing rate. Overloading of memory refers to a condition when one or more applications (e.g., topic 114) using the memory operate with reduced performance or become unresponsive as a result of unavailability of sufficient memory space to store data associated with the application. When the topic manager 113 detects that the publishing rate has equaled or exceeded a pre-selected threshold for the publishing rate, the topic manager 113 throttles the publishing rate so that messages 118 are published to the topic 114 at a rate slower than a current rate of publishing in an attempt to bring the publishing rate below the pre-selected threshold publishing rate. The threshold publishing rate may be set lower than or equal to the maximum supported publishing rate. For example, the memory may be overloaded if the publishing rate of the messages 118 exceeds the maximum publishing rate supported by the primary memory 112. The threshold publishing rate may be set lower than the maximum publishing rate in order to detect near topic/memory overload so that a topic/memory may be kept from overloading by initiating the throttling. Alternatively, the threshold publishing rate may be set equal to the maximum supported publishing rate in order to detect when a topic/memory overload occurs. In this case, throttling may be initiated to recover from the overload. In one or more aspects, an amount of throttling applied to the publishing of messages 118 may be determined based on a pre-selected threshold for an occupancy level of the primary memory 112 or a portion of the primary memory 112 assigned for storing messages for the topic 114. The amount of throttling refers to a magnitude of reduction in the rate at which messages 118 are published to the topic 114. For example, the amount of throttling applied to the publishing of messages is selected to keep the volume of messages stored in the primary memory 112 for the topic 114 from exceeding the pre-selected threshold for the occupancy level of the primary memory 112.

In order to implement the throttling of the publishing rate of messages to the topic 114, the topic manager 113 may assign a priority 117 to each message 118 received by the publish-subscribe server 110 and determine whether each message is to be published to the topic 114 based on the assigned priority 117 of the message. In one or more aspects, the priority 117 assigned to a message may be selected from at least two pre-selected priority levels. For example, a message may be assigned a high priority or a low priority. In response to detecting that the publishing rate of the messages to the topic 114 has equaled or exceeded the pre-selected threshold publishing rate, the topic manager 113 may forward for publishing to the topic 114 only those messages which have a high assigned priority. Messages having a low assigned priority may be forwarded to the secondary storage device 140.

The priority 117 assigned to a message 118 received at the publish-subscribe server 110 may be selected from more than two priority levels. For example, a message 118 may be assigned a high, medium or low priority. Multiple pre-selected thresholds may be defined for the publishing rate and messages 118 having which one or more of the multiple priority levels are to be forwarded for publishing to the topic 114 may be determined based on the multiple thresholds. For example, a first threshold and a second threshold may be defined for the publishing rate, wherein the first threshold is lower than the second threshold. When the monitored publishing rate of messages 118 equals or exceeds the first threshold, messages 118 having high and medium priorities may be forwarded for publishing to the topic 114 while low priority messages may be forwarded to the secondary storage device 140. When the monitored publishing rate of messages 118 equals or exceeds the second threshold, only high priority messages may be forwarded for publishing to the topic 114, while medium and low priority messages may be forwarded to the secondary storage device 140.

In one or more aspects, the topic manager 113 may assign priorities 117 to each message 118 based on one or more attributes associated with the message. In one or more aspects, each message 118 received at the publish-subscribe server 110 includes information relating to at least one attribute. An attribute associated with a message may include but is not limited to at least one of an origin of the message, a value associated with the message or a time stamp associated with the message. For example, in the context of the medical application discussed above, each medical record may be associated with at least one of information relating to a publishing entity publishing the medical record to the topic, a value of the medical record or a time stamp indicating a time at which the medical order was sent out by the publishing entity or received at the publish-subscribe server 110. The value associated with a medical record may be based on the diagnosis of a patient to which the medical record relates. For example, a medical record reporting a diagnosis of a contagious condition may have a higher associated value as compared to a medical record reporting a diagnosis of a non-contagious condition. In this context, a priority may be assigned to each medical record received at the publish-subscribe server 110 based on the publishing entity reporting the medical record, a value associated with the medical record, the time stamp associated with the medical record or a combination thereof. For example, certain hospitals known to handle larger volumes of patients may be assigned a higher priority as compared to other medical facilities. Similarly, medical records associated with higher values may be assigned higher priorities as compared to medical records having lower values. For example, medical records associated with values that equal or exceed a pre-selected threshold value are assigned a high priority. Further, medical records having earlier time stamps may be assigned higher priorities as compared to medical records having later time stamps. That is, medical records which were reported earlier or received earlier at the publish-subscribe server 110 may be assigned higher priorities as compared to medical records which were reported later or received later at the publish subscribe-server 110.

In one or more aspects, information relating to the priorities assigned to the messages 118 may be stored in the primary memory 112 (shown as message priorities 117).

In one or more aspects, while processing messages 118 received at the publish-subscribe server 110 for determining whether each message 118 is to be published to the topic 114, the topic manager 113 may temporarily store the messages 118 in the temporary cache 115. For example, messages received at the publish-subscriber server 110 may be retained in the temporary cache 115 as the topic manager 113 reads one or more attributes associated with each message retained in the cache 115 and determines based on the one or more attributes whether each message is to be published to the topic 114. Messages may be forwarded from the cache 115 to the topic 114 in the primary memory 112 or to the secondary storage device 140 based on the assigned priorities of the messages.

Topic Clean-Up

In one or more aspects, the topic manager 113 is configured to monitor an occupancy level of the primary memory 112 or the portion of the primary memory 112 assigned for storing messages published to and contained in the topic 114. As noted above, occupancy level refers to an amount of the primary memory 112 or the portion of the primary memory occupied by messages 118 contained in the topic 114. When the monitored occupancy level equals or exceeds a pre-selected threshold for the occupancy level, the topic manager 113 is configured to initiate a topic clean-up of the topic 114 in an attempt to bring the occupancy level below the pre-selected threshold. In one or more aspects, the topic-cleanup of the topic 114 includes transferring at least a portion of the messages contained in the topic 114 from the primary memory 112 to the secondary storage device 140 in order to bring down the occupancy level of the primary memory 112 below a pre-selected threshold memory occupancy. In one or more aspects, the pre-selected threshold for the occupancy level may be set lower than an occupancy level that would overload the topic 114. This keeps the topic from being overloaded by triggering the topic clean-up before a topic overload occurs. Alternatively, the pre-selected threshold for the occupancy level may be set at a level that would cause overload of the topic 114. In such a case, the topic-clean up performs a real-time recovery from a topic overload.

In order to implement the clean-up of the topic 114, the topic manager 113 assigns a priority 117 to at least a portion of the messages 118 contained in the topic 114 and determines whether each of the portion of the messages 118 is to be transferred out of the topic 114 to the secondary storage device 140 based on the assigned priority of the message 118. The priority 117 assigned to a message 118 may be selected from at least two pre-selected priority levels. For example, a message 118 may be assigned a high priority or a low priority. In response to detecting that the occupancy level of the primary memory 112 or the portion of the primary memory 112 assigned to the topic 114 has equaled or exceeded the pre-selected threshold memory occupancy level, the topic manager 113 may forward to the secondary storage device 140 only those messages 118 which have a low assigned priority. Messages having a high assigned priority may be retained in the topic 114.

Additionally or alternatively, the priority 117 assigned to a message 118 received at the publish-subscribe server 110 may be selected from more than two priority levels. For example, a message 118 may be assigned a high, medium or low priority. Multiple pre-selected thresholds may be defined for the memory occupancy level and messages 118 having which one or more of the multiple priority levels are to be forwarded to the secondary storage device 140 may be determined based on the multiple thresholds. For example, a first threshold and a second threshold may be defined for the message publishing rate, wherein the first threshold is lower than the second threshold. When the monitored occupancy level equals or exceeds the first threshold, only those messages 118 having low priorities may be forwarded to the secondary storage device 140 while medium and high priority messages may be retained in the topic 114. When the monitored memory occupancy level equals or exceeds the second threshold indicating that the topic is closer to an overload situation, low and medium priority messages may be forwarded to the secondary storage device 140, while only high priority messages may be retained in the topic 114.

As described above, the topic manager 113 may assign priorities 117 to each message 118 based on one or more attributes associated with the message 118. For example, in the context of the medical application discussed above, a priority may be assigned to each medical record received at the publish-subscribe server 110 based on the publishing entity 120 reporting the medical record, a value associated with the medical record, a time stamp associated with the medical record or a combination thereof. Assigning priorities to the messages 118 based on the attributes associated with the messages 118 is described above in the context of throttling the publishing rate of messages 118 and will not be described in further detail here.

In one or more aspects, the topic manager 113 is configured to simultaneously monitor the publishing rate of messages 118 to the topic 114 and the occupancy level of the primary memory 112. The topic manager 113 may use a combination of throttling the message publishing rate and topic clean-up in order to keep the topic from overloading or recover from a topic overload. For example, when the publishing rate of the messages 118 to the topic 114 equals or exceeds a pre-selected publishing rate threshold, throttling the publishing rates by publishing only high priority messages to the topic 114 may not bring the publishing rate below the publishing threshold. For example, a large spike in high priority messages received from a high priority customer may cause most of the messages received at the publish-subscribe server 110 to be forwarded for publishing to the topic 114. However, the topic 114 may contain lower priority messages previously published to the topic 114. In such a case, the topic manager 113 may continue forwarding the high priority messages for publishing to the topic 114 and may rely on topic clean-up to keep the topic from overloading or recover from a topic overload. For example, to help keep the topic from overloading or recover from a topic overload, the topic manager 113 may additionally implement topic clean-up to transfer at least a portion of the lower priority messages already contained in the topic 114 from the primary memory 112 to the secondary storage device 140.

In one or more aspects, the topic manager 113 is configured to simultaneously monitor the publishing rate of messages to the topic 114 and the occupancy level of the primary memory 112. The topic manager 113 may trigger topic clean-up and additionally determine a rate of topic clean-up to be applied to the topic based on a combination of the monitored publishing rate and occupancy level of the primary memory 112. The rate of topic clean-up refers to a rate at which messages are transferred out of the primary memory 112 to the secondary storage device 140. For example, a large spike in publishing rate of the messages to the topic may indicate an imminent topic overload. Thus, the topic manager 113 may be configured to trigger the topic clean-up when an increase in the message publishing rate equals or exceeds a threshold increase in the publishing rate. Additionally or alternatively, once the topic clean-up is triggered, the topic manager 113 may determine a rate at which messages are transferred out of the primary memory 112 based on at least one of the publishing rate or a message clearing time. Generally, once published to the topic 114 a message clears the topic 114 (e.g., deleted from the primary memory 112) after the message has been pushed out to all subscribers of the topic 114. The message clearing time defines the amount of time a message spends in the topic 114 from the time the message is published to the topic 114 to the time the message is cleared out of the topic 114. The topic manager 114 may additionally monitor an average message clearing time for the topic 114. During a clean-up of the topic 114, the topic manager 113 is configured to increase the rate at which messages are transferred out of the primary memory 112 as a function of how much higher the publishing rate is as compared to the message clearing time. For example, higher the publishing rate is compared to the message clearing time, higher is the rate at which messages are transferred out of the primary memory 112. In certain aspects machine learning algorithms may be used in order to detect a topic overloading or near topic overloading condition. For example, the topic manager 113 may be configured to identify certain pre-defined memory utilization patterns that indicate overloading of the topic 114 or near overloading of the topic 114. A pre-defined memory utilization pattern may indicate the utilization of the portion of the primary memory 112 assigned to the topic as a function of a publishing rate of the messages 118 to the topic 114, an occupancy level of the portion of the primary memory device 112, a rate at which messages 118 are cleared out of the topic 114 after publishing, or a combination thereof. For example, one pre-defined memory utilization pattern may include the publishing rate of the messages 118 exceeding a pre-defined threshold and the rate at which messages are cleared out of the topic 114 falling below another pre-defined threshold.

The topic manager 113 may monitor a pattern of the utilization of the portion of the primary memory device 112 assigned to store the messages 118 of the topic 114, wherein the pattern of the utilization is based on at least one of a publishing rate of the messages, an occupancy level of the portion of the primary memory device 112, or a rate at which messages 118 are cleared out of the topic 114 after publishing. The topic manager 113 may detect that the pattern of the utilization matches a predefined pattern of the utilization. In response to the detecting, the topic manager 113 may throttle the publishing rate of the messages 118 to the topic 114, transfer a portion of the messages 118 from the topic 114 to the secondary storage device 140.

Message Restore to the Topic

In one or more aspects, the topic manager 113 may be configured to restore messages from the secondary storage device 140 to the topic 114 for storing in the primary memory 112, when the resource utilization by the topic 114 drops below one or more pre-selected thresholds. For example, the topic manager 113 may start transferring messages from the secondary storage device 140 to the primary memory 112 in response to detecting that the publishing rate of the messages has dropped below a publishing rate threshold, the occupancy level of the primary memory 112 or a portion of the primary memory 112 assigned to the topic 114 has dropped below an memory occupancy level threshold, or both the publishing rate and the memory occupancy level have dropped below their respective thresholds. In one or more aspects, the topic manager 113 may restore messages in a descending order of message priorities starting with messages having the highest assigned priorities. For example, when a message may be assigned a high priority or a low priority, the topic manager 113 may first transfer out the high priority messages from the secondary memory device 140 before transferring out the low priority messages.

Managing a Topic

Figure 2:
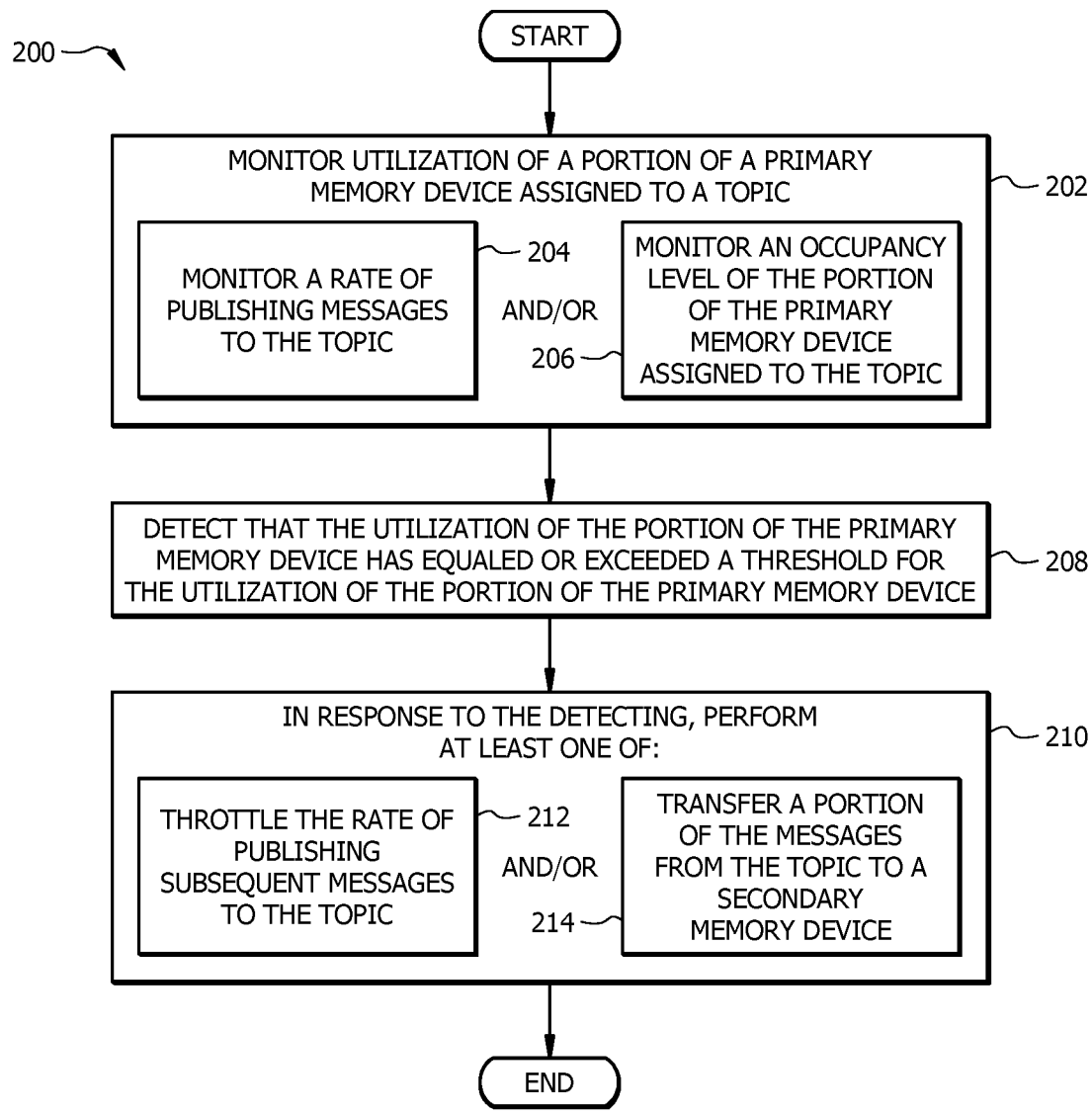
FIG. 2 is a flowchart of a method for managing a topic, in accordance with certain aspects of the present disclosure.

FIG. 2 is a flowchart of a method 200 for managing a topic (e.g., topic 114), in accordance with certain aspects of the present disclosure. The method 200 as illustrated in FIG. 2 and described herein may be performed by the topic manager 113 of FIG. 1. For example, the topic manager 113 may perform the method 200 for keeping a portion of a primary memory device 112 storing the topic 114 from overloading or for recovering from an overloading of the portion of the primary memory device 112. Overloading of the portion of the primary memory device 112 refers to a condition when the topic 114 (and one or more applications associated with the topic 114) operates with reduced performance or becomes unresponsive as a result of unavailability of sufficient memory space within the portion of the primary memory device 112 to store the messages 118.

At step 202, the topic manager 113 monitors utilization of a portion of the primary memory device 112 assigned to the topic 114 and that stores messages 118 published to and contained in the topic 114. As described above, the topic 114 is a logical container for the messages 118, wherein messages 118 can be published to the topic by one or more publishing entities 120 for delivery of the messages 118 to one or more subscribing entities 130. Utilization of the portion of the primary memory device 112 may include at least one of how fast the portion of the primary memory device is being occupied by messages 118 being published to the topic 114 or how much of the portion of the primary memory device 112 is being occupied by the messages 118 contained in the topic 114.

At step 202, monitoring the utilization of the portion of the primary memory device 112 may include a step 204 of monitoring a rate of publishing the messages 118 to the topic 114, a step 206 of monitoring an occupancy level of the portion of the primary memory device 112 assigned to the topic, or a combination thereof. The rate of publishing messages 118 to the topic 114 refers to how fast the messages 118 are being stored in the portion of the primary memory device 112, and thus, may be indicative of how fast the portion of the primary memory device 112 is being occupied by the messages 118 being published to the topic 114. The occupancy level of the portion of the primary memory device 112 utilized by the topic 114 may be representative of an amount of the portion of the primary memory device 112 utilized for storing the messages 118 contained in the topic 114.

At step 208, the topic manager 113 detects that the utilization of the portion of the primary memory 112 device has equaled or exceeded a threshold for the utilization of the portion of the primary memory device 112. In one aspect, when monitoring the rate of publishing the messages 118 at step 204, if the topic manager 113 detects that the rate of publishing the messages 118 has equaled or exceeded a threshold for the rate of publishing, the topic manger determines that the utilization of the portion of the primary memory 112 device has equaled or exceeded the threshold for the utilization of the portion of the primary memory device 112. In this case the rate of publishing the messages 118 is indicative of the utilization of the portion of the primary memory device 112. In an aspect, when monitoring the occupancy level of the portion of the primary memory device 112 at step 206, if the topic manager 113 detects that the occupancy level of the portion of the primary memory device 112 has equaled or exceeded a threshold for the occupancy level of the portion of the primary memory device 112, the topic manger determines that the utilization of the portion of the primary memory 112 device has equaled or exceeded the threshold for the utilization of the portion of the primary memory device 112. In this case the occupancy level of the portion of the primary memory device 112 is indicative of the utilization of the portion of the primary memory device 112.

At step 210, in response to detecting that utilization of the portion of the primary memory 112 device has equaled or exceeded a threshold for the utilization of the portion of the primary memory device 112, the topic manager 113 performs at least one of the steps 212 or step 214. At step 212, the topic manager 113 throttles the rate of publishing subsequent messages 118 to the topic 114. At step 214, the topic manager 113 transfers a portion of the messages 118 from the topic 114 in the primary memory device 112 to the secondary storage device 140. Throttling of the rate of publishing subsequent messages 118 to the topic 114 includes reducing the rate at which the messages 118 are published to the topic 114.

Throttling Publishing Rate of Messages to a Topic

Figure 3:
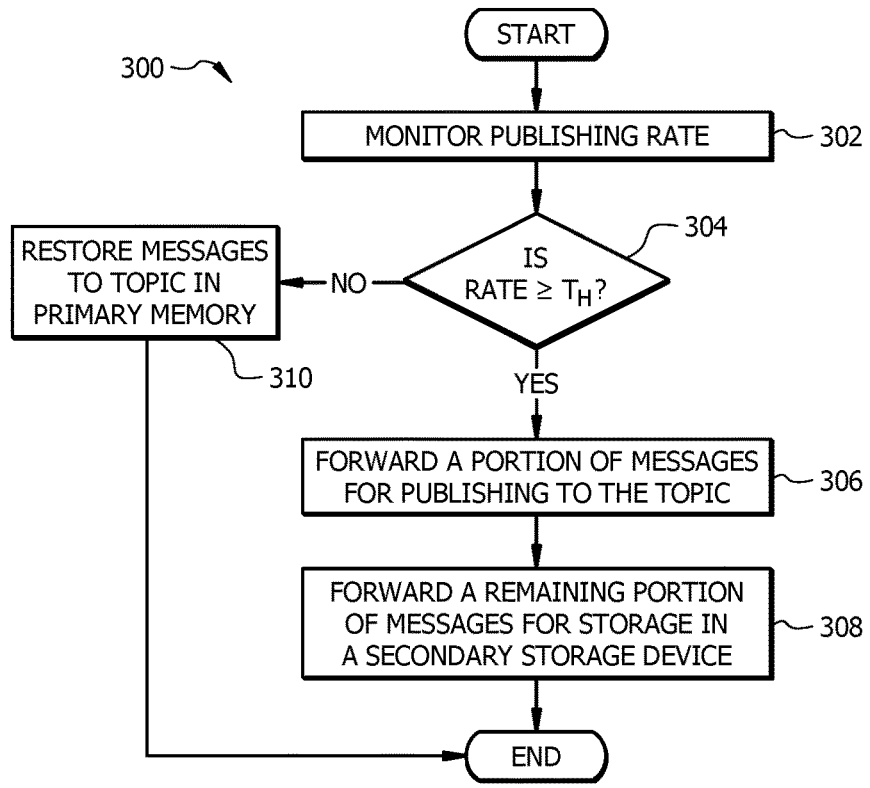
FIG. 3 is a flowchart of a method for throttling a rate of publishing of messages to a topic, in accordance with certain aspects of the present disclosure.

FIG. 3 is a flowchart of a method 300 for throttling a rate of publishing of messages (e.g., messages 118) to a topic (e.g., topic 114), in accordance with certain aspects of the present disclosure. The method 300 as illustrated in FIG. 3 and described herein may be performed by the topic manager 113 of FIG. 1.

At 302, the topic manager 113 monitors the rate of publishing the messages 118 to the topic 114 stored the portion of the primary device 112. This step is the same as the step 204 of method 200 as shown in FIG. 2.

At step 304, the topic manager checks whether the rate of publishing equals or exceeds a threshold for the rate of publishing. If the rate of publishing the messages 118 equals of exceeds the threshold rate of publishing, the method proceeds to step 306 where the topic manager 113 throttles the rate of publishing of subsequent messages received for publishing to the topic 114 by forwarding only a portion of the received subsequent messages 118 for storing in the portion of the primary memory device 112 assigned to the topic 114. By forwarding only a portion of the received messages 118 to the portion of the primary memory device 112 assigned to the topic 114 the topic manager 113 attempts to bring the publishing rate below the threshold rate of publishing. The threshold publishing rate may be set lower than or equal to a maximum publishing rate supported by the portion of the primary memory device 112. For example, the threshold publishing rate may be set lower than the maximum publishing rate in order to detect near topic/memory overload so that a topic/memory may be kept from overloading by initiating the throttling. Alternatively, the threshold publishing rate may be set equal to the maximum supported publishing rate in order to detect when a topic/memory overload occurs. In this case, throttling may be initiated to recover from the overload.

At step 308, the topic manager 113 forwards a remaining portion of the subsequent received messages 118 for storage in the secondary storage device 140. Storing messages that were not published to the topic 114 allows restoring of the messages when the portion of the primary memory device 112 is not overloading and has sufficient memory space to accept the additional messages from the secondary storage device 140. It may be noted that steps 306 and 308 are included in step 212 of the method 200 as shown in FIG. 2.

The topic manager 113 may assign a priority 117 to each received message 118 and may determine whether each message is to be published to the topic 114 for storage in the portion of the primary device 112 based on the assigned priority 117 of the message. In one aspect, the topic manager 113 receives a plurality of messages 118 to be published to the topic 114. The topic manager 113 assigns a first priority level to a first set of the plurality of messages 118 and assigns a second priority level to a second set of the plurality of messages 118, wherein the first priority level is higher than the second priority level. The topic manager 113 throttles the rate of publishing of the messages 118 by forwarding for publishing to the topic 114 at least a portion of the first set of the plurality of messages 118 and forwards to the secondary storage device 140 the second set of the plurality of messages 118.

The priority 117 assigned to a message 118 received at the publish-subscribe server 110 may be selected from more than two priority levels. For example, a message 118 may be assigned a high, medium or low priority. Multiple preselected thresholds may be defined for the publishing rate and messages 118 having which one or more of the multiple priority levels are to be forwarded for publishing to the topic 114 may be determined based on the multiple thresholds. For example, a first threshold and a second threshold may be defined for the publishing rate, wherein the first threshold is lower than the second threshold. When the monitored publishing rate of messages 118 equals or exceeds the first threshold, messages 118 having high and medium priorities may be forwarded for publishing to the topic 114 while low priority messages may be forwarded to the secondary storage device 140. When the monitored publishing rate of messages 118 equals or exceeds the second threshold, only high priority messages may be forwarded for publishing to the topic 114, while medium and low priority messages may be forwarded to the secondary storage device 140.

In one or more aspects, the topic manager 113 may assign priorities 117 to each message 118 based on one or more attributes associated with the message. For example, each message 118 received at the publish-subscribe server 110 includes information relating to at least one attribute. The topic manager 113 may extract one or more attributes associated with each of the received messages 118 and may set a priority level for each messages 118 based on the one or more attributes of the message. An attribute associated with a message may include but is not limited to at least one of an origin of the message, a value associated with the message or a time stamp associated with the message.

At step 304, if the rate of publishing the messages 118 is found below the threshold rate of publishing, the method proceeds to step 310 where the topic manager 113 restores one or more messages 118 from the secondary storage device 140 to the portion of the primary memory device 112 assigned to the topic 114. The topic manager 113 may restore messages 118 in a descending order of message priorities starting with messages having the highest assigned priorities. For example, when a message 118 may be assigned a high priority or a low priority, the topic manager 113 may first transfer out the high priority messages from the secondary memory device 140 before transferring out the low priority messages.

Clean-Up of a Topic

Figure 4:
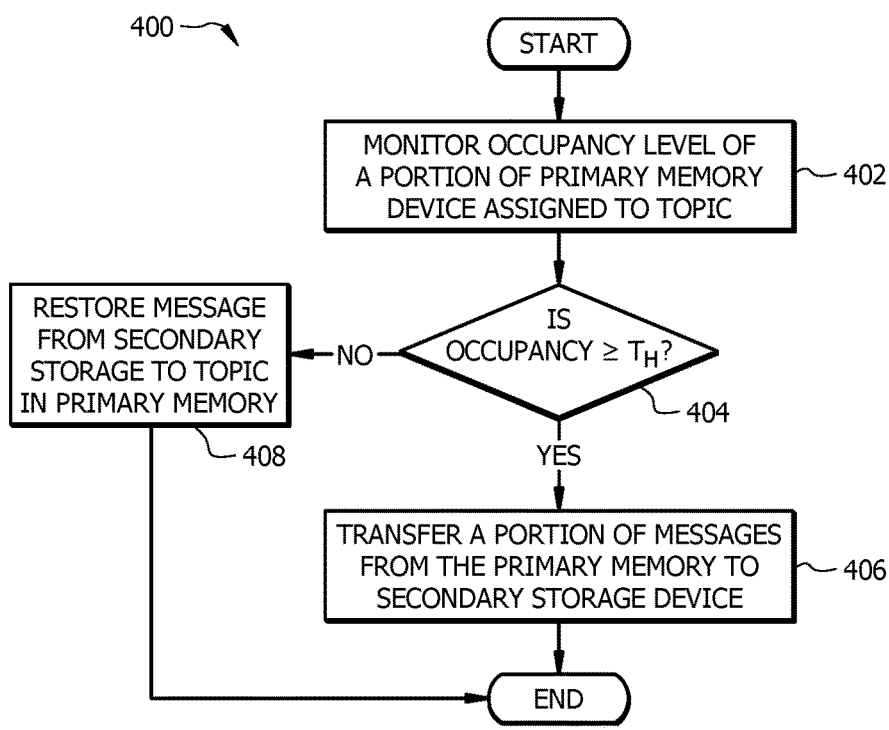
FIG. 4 is a flowchart of a method for clean-up of a topic, in accordance with one or more aspects of the present disclosure.

FIG. 4 is a flowchart of a method 400 for clean-up of a topic (e.g., topic 114), in accordance with one or more aspects of the present disclosure. The method 400 as shown in FIG. 4 and described herein may be performed by a topic manager 113 shown in FIG. 1.

At step 402, the topic manager 113 monitors the occupancy level of the portion of the primary memory device 112 assigned to the topic 114. The occupancy level refers to an amount of the portion of the primary memory device 112 occupied by messages 118 contained in the topic 114. Step 402 is the same as the step 206 of method 200 as shown in FIG. 2.

At step 404, the topic manager 113 checks whether the occupancy level of the portion of the primary memory device 112 has equaled or exceeded a threshold memory occupancy for the portion of the primary memory device 112. If the occupancy level is found to have equaled or exceeded the threshold occupancy, the method 400 proceeds to step 406 where the topic manager 113 transfers a portion of the messages 118 from the portion of the primary memory device 112 to a secondary storage device 140. This transfer of messages 118 from the portion of the primary memory device 112 to the secondary storage device 140 may be referred to as topic clean-up described in the above paragraphs.

The topic manager 113 is configured to initiate the topic clean-up of the topic 114 to bring the occupancy level below the threshold memory occupancy. The threshold memory occupancy may be set lower than an occupancy level that would overload the topic 114. This keeps the topic from being overloaded by triggering the topic clean-up before a topic overload occurs. Alternatively, the threshold memory occupancy may be set at a level that would cause overload of the topic 114. In such a case, the topic-clean up performs a real-time recovery from a topic overload.

The topic manager 113 assigns a priority 117 to at least a portion of the messages 118 contained in the topic 114 and determines whether each of the portion of the messages 118 is to be transferred out of the topic 114 to the secondary storage device 140 based on the assigned priority of the message 118. For example, the topic manager 113 assigns a first priority level to a first set of messages 118 contained in the topic and assigns a second priority level to a second set of messages contained in the topic, wherein the first priority level is higher than the second priority level. The topic manager 113 transfers out one or more messages from the first set of the messages 118 which are assigned the higher first priority level.

The priority 117 assigned to a message 118 contained in the topic 114 may be selected from more than two priority levels. For example, a message 118 may be assigned a high, medium or low priority. Further, multiple pre-selected thresholds may be defined for the memory occupancy level and messages 118 having which one or more of the multiple priority levels are to be forwarded to the secondary storage device 140 may be determined based on the multiple thresholds. For example, a first threshold and a second threshold may be defined for the message publishing rate, wherein the first threshold is lower than the second threshold. When the monitored occupancy level equals or exceeds the first threshold, only those messages 118 having low priorities may be forwarded to the secondary storage device 140 while medium and high priority messages may be retained in the topic 114. When the monitored memory occupancy level equals or exceeds the second threshold indicating that the topic is closer to an overload situation, low and medium priority messages may be forwarded to the secondary storage device 140, while only high priority messages may be retained in the topic 114.

As described above, the topic manager 113 may assign priorities 117 to each message 118 based on one or more attributes associated with the message 118.

At step 404, if the occupancy level of the portion of the primary memory device 112 is found below the threshold memory occupancy, the method 400 proceeds to step 408 where the topic manager 113 restores one or more messages 118 from the secondary storage device 140 to the portion of the primary memory device 112 assigned to the topic 114. The topic manager 113 may restore messages 118 in a descending order of message priorities starting with messages having the highest assigned priorities. For example, when a message 118 may be assigned a high priority or a low priority, the topic manager 113 may first transfer out the high priority messages from the secondary memory device 140 before transferring out the low priority messages.

Publish-Subscribe Server Hardware Configuration

Figure 5:
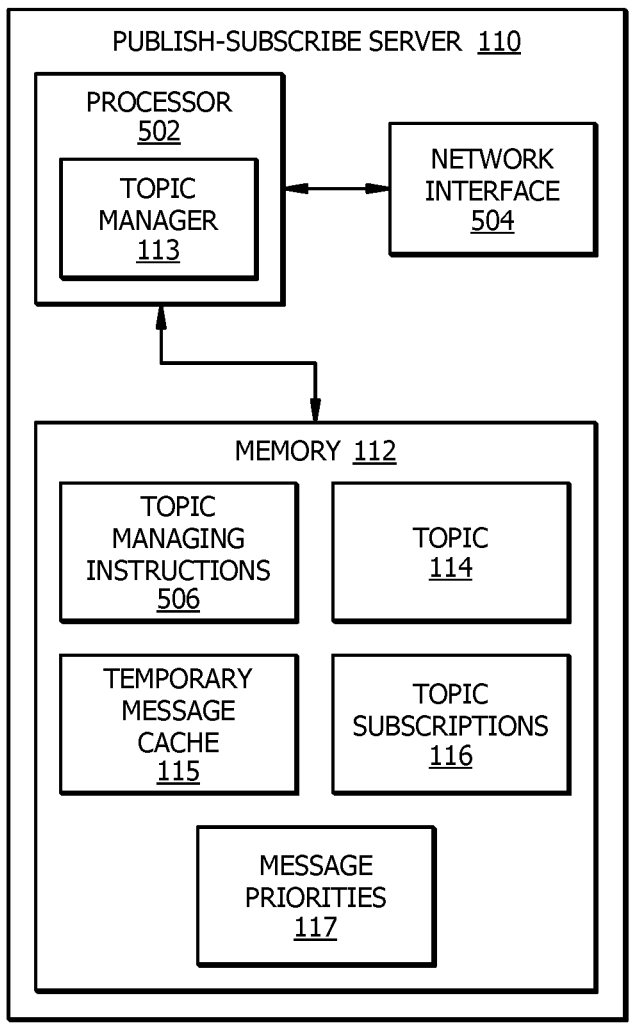
FIG. 5 illustrates an example schematic diagram of a publish-subscribe server, in accordance with one or more aspects of the present disclosure.

FIG. 5 illustrates an example schematic diagram of a publish-subscribe server (e.g. publish-subscribe server 110), in accordance with one or more aspects of the present disclosure. publish-subscribe server 110 comprises a processor 502, a memory 112, and a network interface 504. The publish-subscribe server 110 may be configured as shown in FIG. 5 or in any other suitable configuration.

The processor 502 comprises one or more processors operably coupled to the memory 112. The processor 502 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 502 may be a programmable logic device, a microcontroller, a microprocessor, or any suitable combination of the preceding. The processor 502 is communicatively coupled to and in signal communication with the memory 112. The one or more processors are configured to process data and may be implemented in hardware or software. For example, the processor 502 may be 8-bit, 16-bit, 32-bit, 64-bit or of any other suitable architecture. The processor 502 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions (topic managing instructions 506) to implement a topic manager 113. In this way, processor 502 may be a special-purpose computer designed to implement the functions disclosed herein. In one or more aspects, the topic manager 113 is implemented using logic units, FPGAs, ASICs, DSPs, or any other suitable hardware. The topic manager 113 is configured to operate as described with reference to FIGS. 1, 2, and 3. For example, the topic manager may be configured to perform methods 200 and 300 as described in FIGS. 2 and 3, respectively.

The memory 112 comprises one or more disks, tape drives, or solid-state drives, and may be used as an over-flow data storage device, to store programs when such programs are selected for execution, and to store instructions and data that are read during program execution. The memory 112 may be volatile or non-volatile and may comprise a read-only memory (ROM), random-access memory (RAM), ternary content-addressable memory (TCAM), dynamic random-access memory (DRAM), and static random-access memory (SRAM).

The memory 112 is operable to store topic managing instructions 506, topic 114, temporary message cache 115, topic subscriptions 116, message priorities 117 and/or any other data or instructions. The topic managing instructions 506 may comprise any suitable set of instructions, logic, rules, or code operable to execute the topic manager 113. The topic 114, temporary message cache 115, topic subscriptions 116 and message priorities 117 are configured similar to the topic 114, temporary message cache 115, topic subscriptions 116 and message priorities 117 respectively described with reference to FIG. 1.

The network interface 504 is configured to enable wired and/or wireless communications. The network interface 504 is configured to communicate data between the publish-subscribe server 110 and other devices (e.g. publishing entities 120, subscribing entities 130, secondary storage device 140 etc.), systems, or domains. For example, the network interface 504 may comprise a Wi-Fi interface, a LAN interface, a WAN interface, a modem, a switch, or a router. The processor 502 is configured to send and receive data using the network interface 504. The network interface 504 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An apparatus comprising:
a primary memory device configured to store messages published to a topic, wherein the topic is a logical container for the messages, wherein one or more of the messages can be published to the topic by a publishing entity for delivery of the one or more messages to one or more subscribers of the topic;
a secondary memory device; and
a processor operationally coupled to the primary memory device and the secondary memory device, the processor configured to:
  monitor utilization of a portion of the primary memory device assigned to the topic, wherein monitoring the utilization comprises at least one of:
    monitoring a rate of publishing of the messages to the topic; and
    monitoring an occupancy level of the portion of the primary memory device assigned to the topic;
  detect that the utilization of the portion of the primary memory device has equaled or exceeded a threshold for the utilization of the portion of the primary memory device;
  in response to the detecting, perform at least one of:
    throttling the rate of publishing of subsequent messages to the topic; and
    transferring a portion of the messages from the primary memory device to the secondary memory device;
  receive a plurality of the messages to be published to the topic;
  assign a first priority level to a first set of the plurality of messages;
  assign a second priority level to a second set of the plurality of messages, wherein the first priority level is higher than the second priority level; and
  throttle the rate of the publishing of the subsequent messages to the topic by:
    forwarding for publishing to the topic at least a portion of the first set of the plurality of messages; and
    forwarding to the secondary memory device the second set of the plurality of messages.

2. The apparatus of claim 1, wherein the processor is further configured to:
  detect that the rate of the publishing has exceeded a threshold for the rate of the publishing; and
  in response, detect that the utilization of the portion of the primary memory device has equaled or exceeded the threshold for the utilization of the portion of the primary memory device.

3. The apparatus of claim 1, wherein the processor is further configured to forward a remaining portion of the first set of the plurality of messages to the secondary memory device.

4. The apparatus of claim 1, wherein the processor is further configured to:
  detect that the occupancy level of the portion of the primary memory device has equaled or exceeded a threshold for the occupancy level for the portion of the primary memory device; and
  in response, detect that the utilization of the portion of the primary memory device has equaled or exceeded the threshold for the utilization of the portion of the primary memory device.

5. The apparatus of claim 1, wherein the processor is further configured to:
  assigning a first priority level to a first set of the messages in the topic; and
  assigning a second priority level to a second set of the messages in the topic, wherein the first priority level is higher than the second priority level;
  wherein each message of the portion of the messages is from the second set of the messages.

6. The apparatus of claim 1, wherein the processor is further configured to:
  detect that the utilization of the portion of the primary memory device assigned to the topic has dropped below the threshold for the utilization; and
  forward one or more messages from the secondary memory device to the primary memory device,
  wherein:
    the secondary memory device comprises a first set of messages assigned a first priority level and a second set of messages assigned a second priority level;
    the first priority level is higher than the second priority level; and
    the one or more messages is from the first set of the messages.

7. The apparatus of claim 1, wherein the processor is further configured to:
  extract at least one attribute associated with each of the messages, wherein the at least one attribute comprises information relating to at least one of an origin of the message, a value associated with the messages, or a time stamp associated with the message; and
  assign a priority level to each of the messages based on corresponding at least one attribute.

8. The apparatus of claim 1, wherein the processor is further configured to:
  monitor a pattern of the utilization of the portion of the primary memory device, wherein the pattern of the utilization is based on at least one of a publishing rate of the messages, an occupancy level of the portion of the primary memory device, or a rate at which messages are cleared out of the topic after publishing;
  detect that the pattern of the utilization matches a predefined pattern of the utilization; and
  in response to the detecting, perform at least one of the throttling or the transferring.

9. The apparatus of claim 1, wherein each of the throttling and the transferring keeps the portion of the primary memory device assigned to the topic from overloading or causes recovery from the overloading.

10. A method for managing resources utilized by a topic, comprising:
  monitoring utilization of the resources by the topic, wherein the topic is a logical container for messages and utilizes a primary memory device to store the messages published to the topic, wherein one or more of the messages can be published to the topic by a publishing entity for delivery of the one or more messages to one or more subscribers of the topic, wherein the monitoring comprises:
    monitoring a rate of publishing of the messages to the topic; and
    monitoring an occupancy level of a portion of the primary memory device assigned to the topic;
  detecting that the utilization of the resources has equaled or exceeded a threshold for the utilization of the resources;
  in response to the detecting, performing at least one of:
    throttling the rate of publishing of subsequent messages to the topic; and
    transferring a portion of the messages from the primary memory device to a secondary memory device;
  receiving a plurality of the messages to be published to the topic;
  assigning a first priority level to a first set of the plurality of messages;
  assigning a second priority level to a second set of the plurality of messages, wherein the first priority level is higher than the second priority level;
  wherein the throttling the rate of publishing of the subsequent messages comprises:
    forwarding for publishing to the topic at least a portion of the first set of the plurality of messages; and
    forwarding to the secondary memory device the second set of the plurality of messages.

11. The method of claim 10, wherein:
detecting that the utilization of the resources has equaled or exceeded the threshold comprises detecting that the rate of publishing has equaled or exceeded a threshold for the rate of publishing.

12. The method of claim 10, further comprising forwarding a remaining portion of the first set of the plurality messages to the secondary memory device.

13. The method of claim 10, wherein:
detecting that the utilization of the resources has equaled or exceeded the threshold comprises detecting that the occupancy level of the portion of the primary memory device has equaled or exceeded a threshold for the occupancy level of the portion of the primary memory device.

14. The method of claim 10, further comprising:
  assigning a first priority level to a first set of the messages in the topic; and
  assigning a second priority level to a second set of the messages in the topic, wherein the first priority level is higher than the second priority level;
  wherein each message of the portion of the messages is from the second set of the messages.

15. The method of claim 10, further comprising:
  detecting that the utilization of the resources has dropped below the threshold for the utilization; and
  forwarding one or more messages from the secondary memory device to the primary memory device, wherein:
the secondary memory device comprises a first set of messages assigned a first priority level and a second set of messages assigned a second priority level;
the first priority level is higher than the second priority level; and
the one or more messages is from the first set of the messages.

16. The method of claim 10, further comprising:
extracting at least one attribute associated with each of the messages, wherein the at least one attribute comprises information relating to at least one of an origin of the message, a value associated with the messages or a time stamp associated with the message; and
assigning a priority level to each of the messages based on corresponding at least one attribute.

17. The method of claim 10, wherein the resources include at least one of processing resources or memory resources.

18. A non-transitory computer-readable medium for storing instructions which when executed by a processor causes the processor to perform a method managing resources utilized by a topic comprising:
monitoring utilization of the resources by the topic, wherein the topic is a logical container for messages and utilizes a primary memory device to store the messages published to the topic, wherein one or more of the messages can be published to the topic by a publishing entity for delivery of the one or more messages to one or more subscribers of the topic, wherein the monitoring comprises:
monitoring a rate of publishing of the messages to the topic; and
monitoring an occupancy level of a portion of the primary memory device assigned to the topic;
detecting that the utilization of the resources has equaled or exceeded a threshold for the utilization of the resources;
in response to the detecting, performing at least one of:
throttling the rate of publishing of subsequent messages to the topic; and
transferring a portion of the messages from the primary memory device to a secondary memory device;
receiving a plurality of the messages to be published to the topic;
assigning a first priority level to a first set of the plurality of messages;
assigning a second priority level to a second set of the plurality of messages, wherein the first priority level is higher than the second priority level;
wherein the throttling the rate of publishing of the subsequent messages comprises:
forwarding for publishing to the topic at least a portion of the first set of the plurality of messages; and
forwarding to the secondary memory device the second set of the plurality of messages.

\* \* \* \* \*